US012618358B2

(12) United States Patent
Wyss

(10) Patent No.: US 12,618,358 B2
(45) Date of Patent: May 5, 2026

(54) RECONDITIONED HARMONIC BALANCER

(71) Applicant: John Wyss, Redding, PA (US)

(72) Inventor: John Wyss, Redding, PA (US)

( * ) Notice: Subject to any disclaimer, the term of this patent is extended or adjusted under 35 U.S.C. 154(b) by 0 days.

(21) Appl. No.: 18/581,503

(22) Filed: Feb. 20, 2024

(65) Prior Publication Data

US 2025/0264053 A1      Aug. 21, 2025

(51) Int. Cl.
*F02B 75/06* (2006.01)
*F16F 15/24* (2006.01)

(52) U.S. Cl.
CPC .............. *F02B 75/06* (2013.01); *F16F 15/24* (2013.01)

(58) Field of Classification Search
CPC .......... F16F 15/173; F16F 15/24; F16F 15/26; F16F 2222/025; F02B 67/06; F02B 75/06; F16H 55/36; F16H 57/0416; F16H 2055/366; B60K 2025/022
See application file for complete search history.

(56) References Cited

U.S. PATENT DOCUMENTS

| | | | |
|---|---|---|---|
| 4,794,816 A | 1/1989 | Serizawa et al. | |
| 4,962,677 A | 10/1990 | Withers | |
| 5,675,078 A * | 10/1997 | Deguara | F02P 7/0677 |
| | | | 340/439 |
| 6,665,918 B1 | 12/2003 | Williams | |
| 10,549,391 B2 | 2/2020 | Stuckey et al. | |

| | | | |
|---|---|---|---|
| 11,668,387 B1 * | 6/2023 | Dunbar | F16H 57/0416 |
| | | | 123/192.1 |
| 2001/0023676 A1 * | 9/2001 | Takano | F16F 15/267 |
| | | | 123/192.1 |
| 2003/0060289 A1 * | 3/2003 | Nichols | F16F 15/1442 |
| | | | 464/89 |
| 2004/0149075 A1 * | 8/2004 | Williams | F16F 15/145 |
| | | | 74/570.2 |
| 2004/0176200 A1 * | 9/2004 | Nosaka | F16D 1/06 |
| | | | 474/166 |
| 2004/0212273 A1 * | 10/2004 | Gould | H02K 7/006 |
| | | | 310/268 |
| 2005/0210661 A1 | 9/2005 | Williams et al. | |
| 2007/0193563 A1 * | 8/2007 | Beattie | F02B 39/12 |
| | | | 192/46 |
| 2008/0011068 A1 * | 1/2008 | Lewis | F01L 1/20 |
| | | | 73/116.04 |
| 2009/0056032 A1 * | 3/2009 | Salanda | F16C 3/20 |
| | | | 7/100 |
| 2009/0078077 A1 * | 3/2009 | Horschel | F16F 15/173 |
| | | | 74/573.1 |

(Continued)

*Primary Examiner* — Hai H Huynh
*Assistant Examiner* — Johnny H Hoang
(74) *Attorney, Agent, or Firm* — Boudwin Intellectual Property Law, LLC; Daniel Boudwin

(57) ABSTRACT

A reconditioned harmonic balancer to replace a worn out or damaged harmonic balancer that is not available otherwise. The reconditioned harmonic balancer includes two or more pieces of metal held together with a cleaned hub, a cleaned inertia ring, a plurality of new elastomer material, a plurality of timing marks that need to be located on a keyway indicator at a precise location, and a plurality of mounting apertures. The timing marks are engraved, single-notched hash marks, or are painted on an outer surface of the cleaned inertia ring. The mounting apertures are disposed on the cleaned hub to secure the reconditioned harmonic balancer to a crankshaft of a vehicle.

15 Claims, 3 Drawing Sheets

(56) References Cited

U.S. PATENT DOCUMENTS

| 2012/0291279 A1* | 11/2012 | Swindell | F02P 7/06 |
| | | | 29/888.011 |
| 2013/0087428 A1* | 4/2013 | Antchak | F16D 13/76 |
| | | | 192/41 S |
| 2015/0252885 A1* | 9/2015 | Manzoor | F16F 15/126 |
| | | | 474/166 |
| 2017/0089189 A1* | 3/2017 | Norris | E21B 17/073 |
| 2017/0248219 A1* | 8/2017 | Kvasnicka | F16H 55/36 |
| 2018/0066729 A1* | 3/2018 | Li | F16C 3/06 |
| 2018/0162213 A1* | 6/2018 | Colavincenzo | B60L 50/15 |
| 2019/0170214 A1* | 6/2019 | Thompson | F16F 15/126 |
| 2020/0232537 A1* | 7/2020 | Voges | F16F 15/283 |
| 2023/0106255 A1* | 4/2023 | Horschel | F16F 15/173 |
| | | | 188/378 |

* cited by examiner

RECONDITIONED HARMONIC BALANCER

BACKGROUND OF THE INVENTION

The present invention relates to a harmonic balancer. More specifically, the present invention relates to a reconditioned harmonic balancer.

Many replacement automotive parts are sometimes subject to not being available because of obsolescence (planned or otherwise) and/or not being made in an aftermarket. The restoration of collectable vehicles helps keep Original Equipment Manufacturer or OEM number matching parts from increasing their value. This may really present big problems for a person who needs an auto replacement part, such as a new harmonic balancer, that may not be available at all.

What is needed is a reconditioned harmonic balancer to replace a worn out or damaged harmonic balancer that is not available otherwise.

In light of the harmonic balancer devices disclosed in the known art, it is submitted that the present invention substantially diverges in functional and design elements from the known art and consequently it is clear that there is a need in the art for an improvement to existing reconditioned harmonic balancers. In this regard the present invention substantially fulfills these needs.

SUMMARY OF THE INVENTION

In view of the foregoing disadvantages inherent in the known types of harmonic balancers now present in the prior art, the present invention provides a reconditioned harmonic balancer, wherein the same OEM parts are utilized for providing convenience for a user when using a reconditioned harmonic balancer that was originally used on that respective engine.

The present system comprises a reconditioned harmonic balancer having a cleaned hub adapted to attach directly to a crankshaft of an engine of a vehicle, a cleaned inertia ring surrounding the cleaned hub, a plurality of elastomer material disposed between the cleaned hub and the cleaned inertia ring, a plurality of timing marks disposed on an outer surface of the cleaned hub and an outer surface of the cleaned inertia ring, a keyway indicator adapted to align the reconditioned harmonic balancer with the crankshaft of the vehicle, a plurality of mounting apertures disposed on the cleaned hub and the cleaned inertia ring to allow the reconditioned harmonic balancer to be adapted to be properly aligned and bolted to a crankshaft flange, a plurality of hash or witness marks disposed on an outer circumference of the cleaned inertia ring, a timing cover pointer aligned with the hash or witness marks disposed on the outer circumference of the degraded harmonic balancer to indicate the elastomer material is failing and allows ignition timing to be checked or corrected to no longer remove harmful vibrations leading to failure of the engine, and a whitened surface area disposed along the thickness of the hash or witness marks to show wear and tear on the hash or witness marks.

It's an object of the present invention to provide a reconditioned harmonic balancer that replaces a worn out or degraded harmonic balancer.

It's an object of the present invention to provide a reconditioned harmonic balancer that replaces a worn out or degraded harmonic balancer without having to go to an aftermarket.

It's an object of the present invention to provide a reconditioned harmonic balancer that prevents the risk of the reconditioned harmonic balancer not being available for replacement.

Other objects, features, and advantages of the present invention will become apparent from the following description taken in conjunction with the accompanying figures.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached figures. For the purposes of presenting a brief and clear description of the present invention, the preferred embodiment will be discussed as used for providing a reconditioned harmonic balancer. The figures are intended for representative purposes only and should not be considered to be limiting in any respect.

Figure 1:
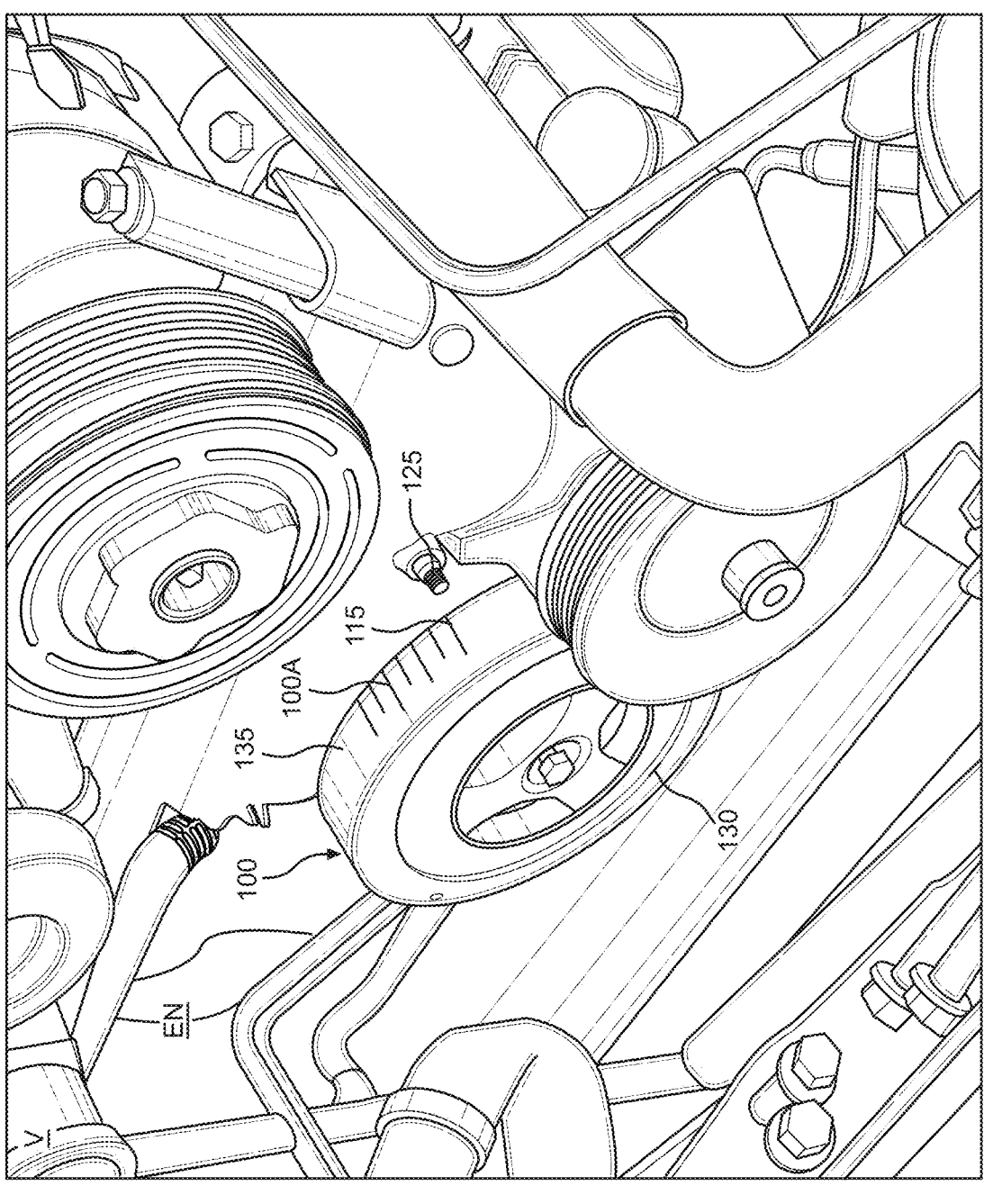
FIG. 1 shows an environmental perspective view of one embodiment of a degraded harmonic balancer installed on an engine of a vehicle.

FIG. 1 shows an environmental perspective view of one embodiment of a degraded harmonic balancer 100 installed on an engine EN of a vehicle V.

The degraded harmonic balancer 100 may be replaced by a reconditioned harmonic balancer (FIG. 3, 200) and may also be called a vibration damper or a crankshaft damper. The reconditioned harmonic balancer 200 may reduce torsional vibrations and harmonics in the engine EN of the vehicle V.

The degraded harmonic balancer 100 may include a plurality of hash or witness marks 115, a timing cover pointer 125, and a whitened surface area 135.

The hash or witness marks 115 may be disposed on an outer circumference 100A of the degraded harmonic balancer 100. The timing cover pointer 125 may be aligned with the hash or witness marks 115 disposed on the outer circumference 100A of the degraded harmonic balancer 100 to indicate a plurality of elastomer material 130 is failing and allows ignition timing to be checked or corrected to no longer remove harmful vibrations leading to failure of the engine EN. The whitened surface area 135 may be disposed along the thickness of the hash or witness marks 115 to show wear and tear on the hash or witness marks 115.

Figure 2:
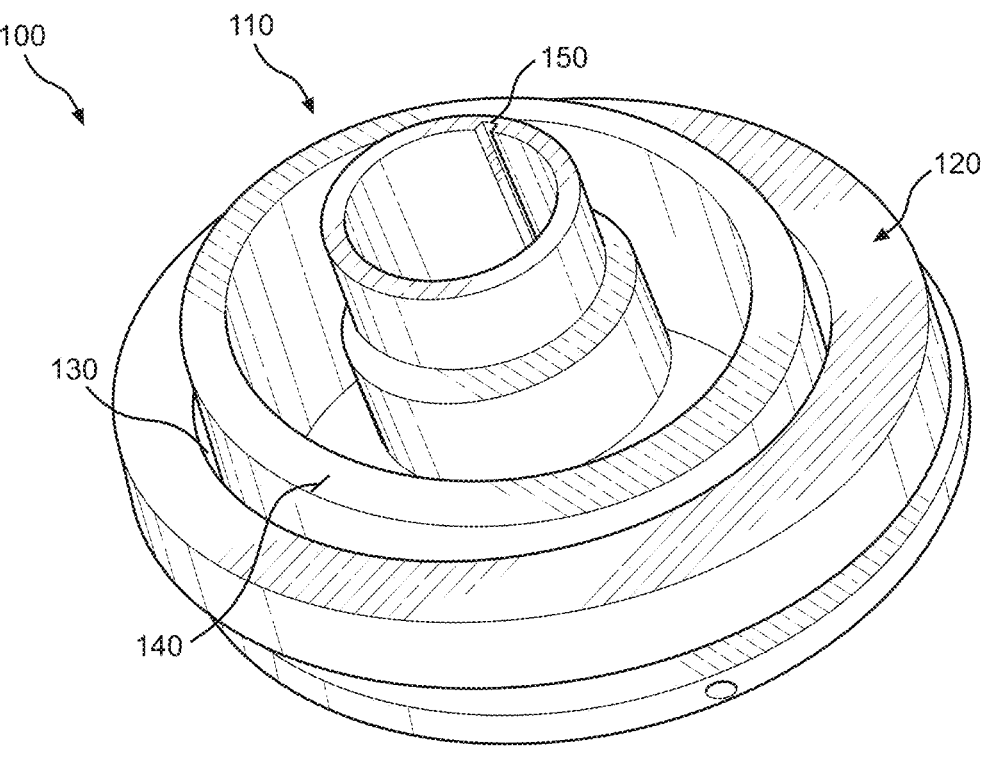
FIG. 2 shows an overhead perspective view of one embodiment of the degraded harmonic balancer.

FIG. 2 shows an overhead perspective view of one embodiment of a degraded harmonic balancer 100.

The degraded harmonic balancer 100 may include a hub 110, an inertia ring 120, a plurality of elastomer material 130, a plurality of timing marks 140, and a keyway indicator 150. The degraded harmonic balancer 100 may sustain damage that includes cracking, misalignment, deterioration of elastomer material, separation of components, rust, corrosion or the like.

The hub 110 may be a central part of the degraded harmonic balancer 100 and is adapted to attach directly to a crankshaft (not shown) of an engine EN of a vehicle V. The inertia ring 120 may add mass to help smooth out any rotational motion of the crank shaft. The elastomer material (FIG. 1, 130) may be exposed to a plurality of elements selected from the group consisting of a plurality of oil, a plurality of dirt, a plurality of grease, a plurality of water, a plurality of heat, a plurality of cold, and the like to degrade the elastomer material 130 and require replacement of the degraded harmonic balancer 100. The timing marks 140 may be adapted to align with the timing marks on the engine's timing cover or other components (all not shown), allowing for precise timing adjustments during engine maintenance or repairs. The keyway indicator 150 may also be known as a crankshaft pulley, may be used to align the degraded harmonic balancer 100 with the crankshaft of the engine EN.

Figure 3:
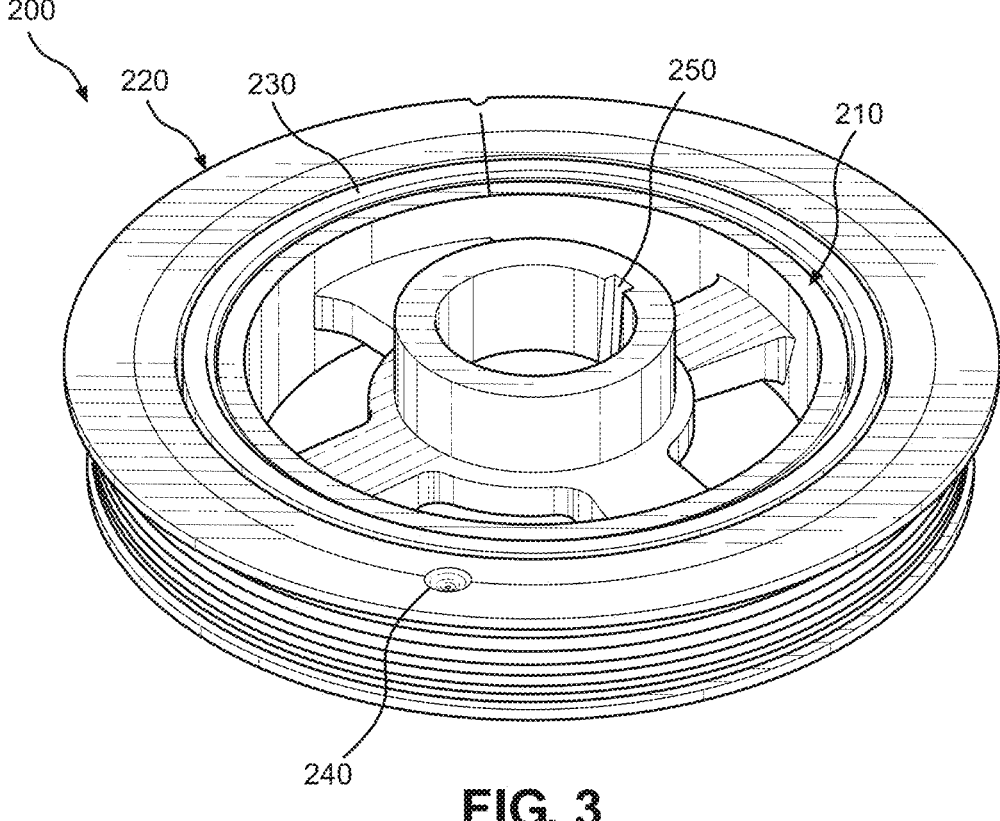
FIG. 3 shows an overhead perspective view of one embodiment of a reconditioned harmonic balancer.

FIG. 3 shows an overhead perspective view of one embodiment of a reconditioned harmonic balancer 200.

The reconditioned harmonic balancer 200 may include a cleaned hub 210, a cleaned inertia ring 220, a plurality of elastomer material 230, a plurality of timing marks 240, and a keyway indicator 250.

The cleaned hub 210 may be a central part of the reconditioned harmonic balancer 200 and is adapted to attach directly to a crankshaft (not shown) of an engine (FIG. 1, EN) of a vehicle (FIG. 1, V). The cleaned hub 210 may be cleaned in a shot blaster and furnace (not shown) or the like.

The cleaned inertia ring 220 may be designed to store and be adapted to absorb energy from the crankshaft's torsional vibrations. Additional vibration reduction may be accomplished by adding a plurality of grooves, a plurality of slots, or a plurality of divots to either the cleaned hub 210 or the cleaned inertia ring 220 increasing rubber volume in those areas. The cleaned inertia ring 220 may be cleaned in a shot blaster and furnace (not shown) or the like to eliminate any possible contamination from a plurality of prior materials, a plurality of oils, a plurality of rust, or the like.

The elastomer material 230 may be disposed between the cleaned hub 210 and the cleaned inertia ring 220. The elastomer material 230 may serve as a damping medium and helps absorb and dissipate vibrations adapted to be generated by the engine EN. The elastomer material 230 may act as a cushion between the cleaned hub 210 and the cleaned inertia ring 220 and is adapted to reduce transmission of vibrations to the crankshaft (not shown). The elastomer material 230 may be made of another elastomer, or the like.

The timing marks 240 may be engraved or painted on an outer surface of the cleaned hub 210 and the outer surface of the cleaned inertia ring 220 or the like. The timing marks 240 may be factory balanced to correct an inherit metal imbalance. The timing marks 240 may be cut in a timing V-notch 240A or the like.

The keyway indicator 250 may locate and maintain the reconditioned harmonic balancer 200.

Figure 4:
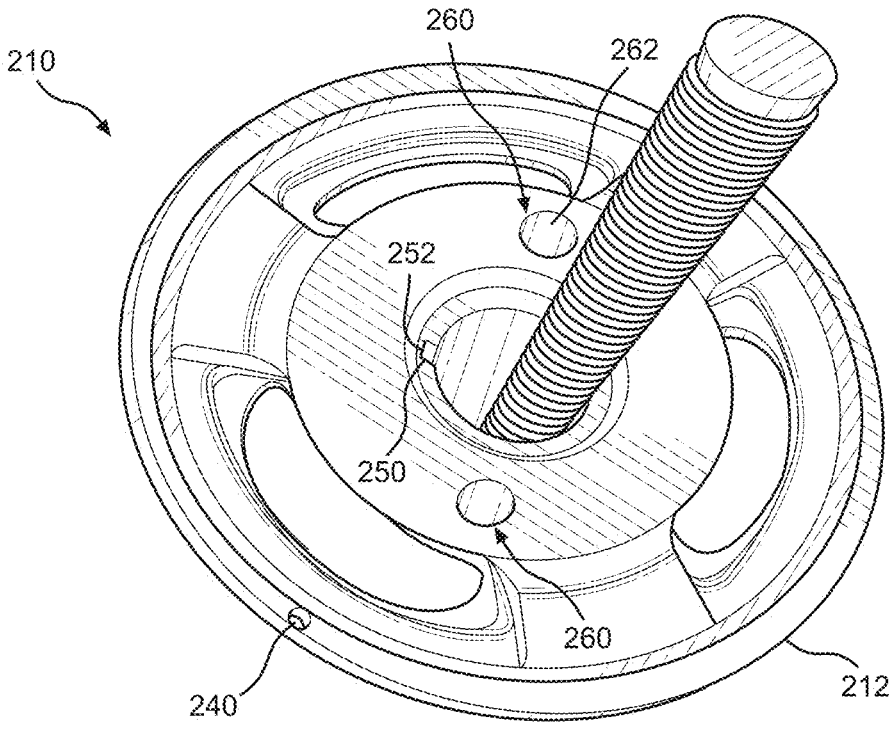
FIG. 4 shows an overhead perspective view of one embodiment of a cleaned hub of the reconditioned harmonic balancer.

FIG. 4 shows an overhead perspective view of one embodiment of a cleaned hub 210 of a reconditioned harmonic balancer 200.

The cleaned hub 210 may be made of steel, cast iron, or the like and is adapted to be responsible for transmitting a rotational motion from the crankshaft to the reconditioned harmonic balancer 200.

The cleaned hub 210 may include the keyway indicator 250, which may be a slot 252 or the like. The slot 252 may be approximately 40 degrees to a centerline of the hub to maintain a balance. The cleaned hub 210 may include one of the timing marks 240 disposed on a top edge 212 of the cleaned hub 210.

The cleaned hub 210 may include a plurality of mounting apertures 260 that may secure the reconditioned harmonic balancer 200 to the crankshaft (not shown). The mounting apertures 260 may allow the reconditioned harmonic balancer 200 to be properly aligned and bolted to the crankshaft flange (not shown). The mounting apertures 260 may be a plurality of circular apertures 262, or the like.

Figure 5:
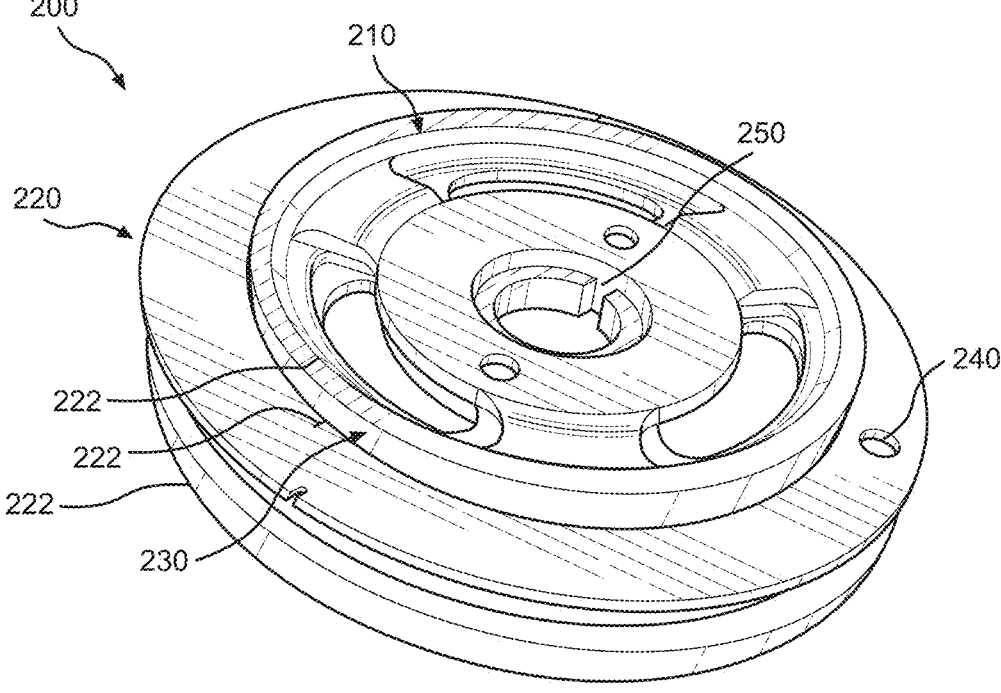
FIG. 5 shows an overhead perspective view of one embodiment of the reconditioned harmonic balancer.

FIG. 5 shows an overhead perspective view of one embodiment of a reconditioned harmonic balancer 200. More specifically, FIG. 5 shows the cleaned inertia ring 220 in relation to the cleaned hub 210. The cleaned inertia ring 220 and the cleaned hub 210 must be centered to one another and spin in unison after being refurbished.

The cleaned inertia ring 220 may be made of steel or the like and may have a plurality of serpentine or V-belt grooves 222 to drive accessories on its surface to improve its effectiveness.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The invention claimed is:

1. A reconditioned harmonic balancer, comprising:
a cleaned hub adapted to attach directly to a crankshaft of an engine of a vehicle;
a cleaned inertia ring surrounding the cleaned hub;
a plurality of elastomer material disposed between the cleaned hub and the cleaned inertia ring;
a plurality of timing marks disposed on an outer surface of the cleaned hub and an outer surface of the cleaned inertia ring;
a keyway indicator adapted to align the reconditioned harmonic balancer with the crankshaft of the vehicle;
a plurality of mounting apertures disposed on the cleaned hub and the cleaned inertia ring to allow the reconditioned harmonic balancer to be adapted to be properly aligned and bolted to a crankshaft flange;
a plurality of hash or witness marks disposed on an outer circumference of the cleaned inertia ring; and
a whitened surface area disposed along the thickness of the hash or witness marks;
wherein the cleaned hub is cleaned in a shot blaster and furnace;
wherein the cleaned inertia ring is cleaned in a shot blaster and furnace;
wherein the timing marks are factory balanced to correct an inherit metal imbalance; and
wherein the cleaned inertia ring includes a serpentine pattern on its surface to improve its effectiveness.

2. The reconditioned harmonic balancer, according to claim 1, wherein the cleaned hub is adapted to be responsible for transmitting a rotational motion from the crankshaft to the reconditioned harmonic balancer.

3. The reconditioned harmonic balancer, according to claim 1, wherein the cleaned hub is made of steel.

4. The reconditioned harmonic balancer, according to claim 1, wherein the cleaned hub is made of cast iron.

5. The reconditioned harmonic balancer, according to claim 1, wherein the cleaned inertia ring is designed and adapted to store and absorb energy from the crankshaft of the vehicle and its torsional vibrations.

6. The reconditioned harmonic balancer, according to claim 1, wherein the cleaned inertia ring is made of steel.

7. The reconditioned harmonic balancer, according to claim 1, wherein the elastomer material serves as a damping medium and helps absorb and dissipate vibrations adapted to be generated by cycles of balance imbalance in the engine of the vehicle.

8. The reconditioned harmonic balancer, according to claim 1, wherein the elastomer material is vulcanized rubber with a variable durometer result.

9. The reconditioned harmonic balancer, according to claim 8, wherein the elastomer material is silicone vulcanized rubber.

10. The reconditioned harmonic balancer, according to claim 1, wherein the timing marks are cut in a timing V-notch disposed on the outer surface of the cleaned inertia ring.

11. The reconditioned harmonic balancer, according to claim 1, wherein the timing marks are permanently painted on the outer surface of the cleaned inertia ring.

12. The reconditioned harmonic balancer, according to claim 1, wherein the keyway indicator is a slot.

13. The reconditioned harmonic balancer, according to claim 12, wherein the slot is 40 degrees to a centerline of the hub to maintain a balance.

14. The reconditioned harmonic balancer, according to claim 1, wherein the mounting apertures are a plurality of circular holes.

15. The reconditioned harmonic balancer, according to claim 1, wherein the reconditioned harmonic balancer reduces torsional vibrations and harmonics in the engine of the vehicle.

\* \* \* \* \*